United States Patent [19]
Butler et al.

[11] Patent Number: 5,680,208
[45] Date of Patent: Oct. 21, 1997

[54] GRAVITY ORIENTED LASER SCANNER

[75] Inventors: Andrew G. Butler, Palo Alto; Eugene F. Duval; Gregory L. Richards, both of Menlo Park; Mitchell C. Barham, Redwood City; Daniel T. Adams, Menlo Park; William A. Scott, Palo Alto; David C. Shafer, Menlo Park, all of Calif.

[73] Assignee: DWBH Ventures Ltd., Nassau, Bahamas

[21] Appl. No.: 609,552

[22] Filed: Mar. 1, 1996

[51] Int. Cl.⁶ .......................... G01C 9/12; G01C 11/00; G01C 15/08

[52] U.S. Cl. .......................... 356/250; 33/273; 33/283; 33/275.6; 33/295; 356/148; 356/147

[58] Field of Search .................... 356/138, 139, 356/140, 141.1–141.3, 142, 143, 145–147, 148–151, 248–250, 253, 254; 33/273, 274, 278, 280–286, 290–298

[56] References Cited

U.S. PATENT DOCUMENTS

| | | | |
|---|---|---|---|
| 3,859,736 | 1/1975 | Hill et al. ................................. | 35/12 |
| 4,828,376 | 5/1989 | Padera ................................... | 350/500 |
| 4,907,879 | 3/1990 | Webb ..................................... | 356/141 |
| 5,075,977 | 12/1991 | Rando . | |
| 5,182,863 | 2/1993 | Rando . | |
| 5,287,627 | 2/1994 | Rando . | |
| 5,537,205 | 7/1996 | Costa et al. ............................. | 356/250 |
| 5,541,727 | 7/1996 | Rando et al. ........................... | 356/149 |

OTHER PUBLICATIONS

Delta Airlines Mail Catalogue, Jan. 1996, pp. 20, 22.

Levelite Technology, Inc. brochures, Jan. 1996, 10 pages.

*Primary Examiner*—Frank G. Font
*Assistant Examiner*—Michael P. Stafira
*Attorney, Agent, or Firm*—Fliesler, Dubb, Meyer & Lovejoy

[57] ABSTRACT

A laser scanner 50 includes a laser 76 affixed to a pendulum 66 with a damper 80 for damping the movement of the pendulum 66. The laser scanner 50 is controllable through a remote control 62 for positioning the laser beam as desired. Both horizontal and vertical laser beams can be projected in order to orient the laser scanner 50 with respect to gravity and simultaneously elevation.

29 Claims, 14 Drawing Sheets

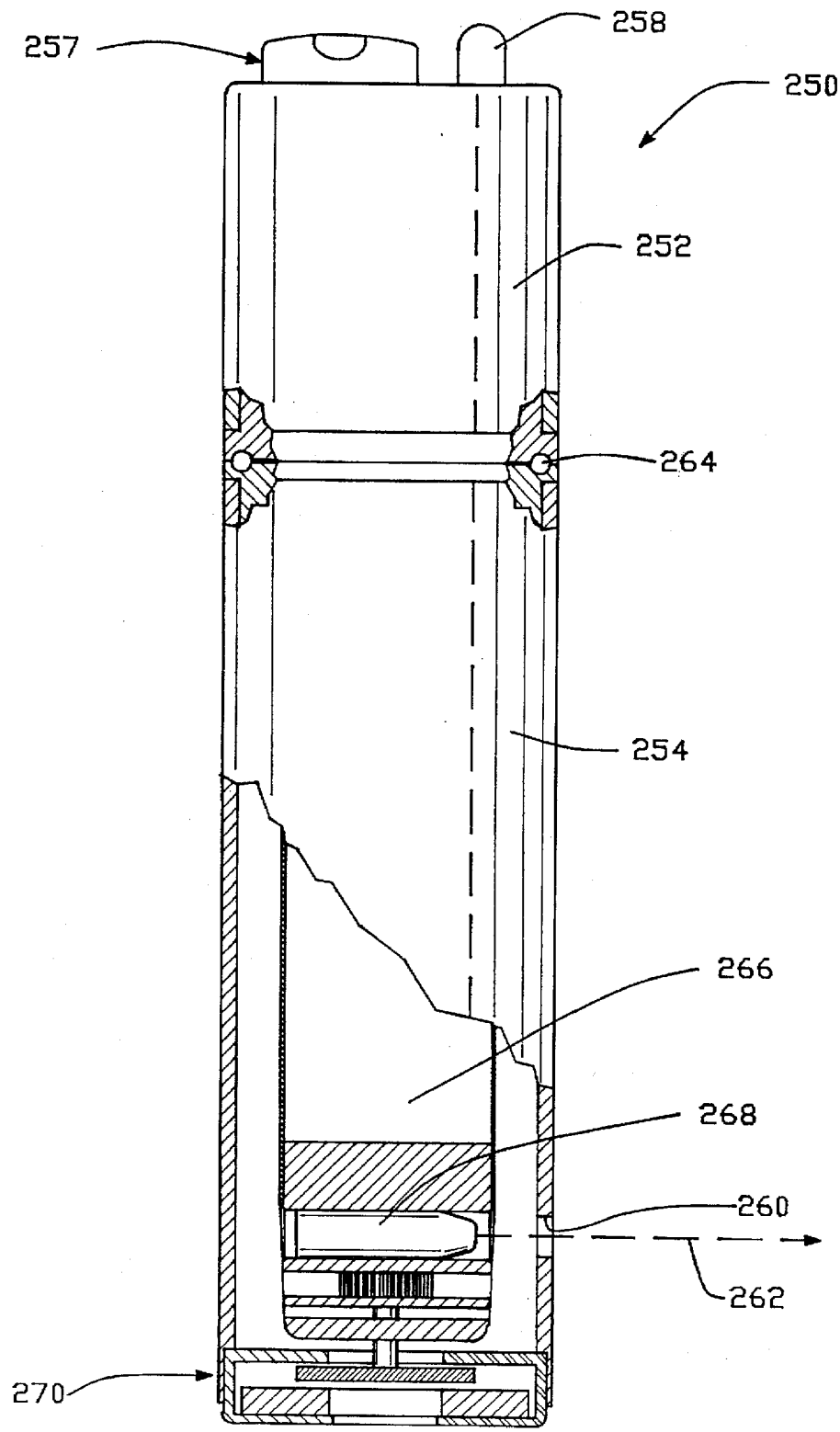
FIG.—14

GRAVITY ORIENTED LASER SCANNER

FIELD OF THE INVENTION

The present invention is directed to a mechanism using a laser beam to determine at least one of vertical and horizontal orientation.

BACKGROUND OF THE INVENTION

Prior art exists in the field of measuring a horizontal plane relative to gravity. Standard transits, theodelites, and builder's levels are tripod mounted optical devices. To be accurate, such devices require an extremely precise leveling of the unit relative to the tripod. The bubble levels and electronic sensors used in the instrument mounts are elaborate, expensive, and very time consuming to use each time the unit is moved to a new location.

SUMMARY OF THE INVENTION

Accordingly a laser scanner is provided that directs a laser beam in at least one of a horizontal and a vertical direction and overcomes the disadvantages of the prior art. The laser scanner can rotate the direction of the beam through a full 360° in a horizontal plane. The horizontal laser beam can be used for surveying or for alignment.

A laser scanner of one embodiment of the invention includes a pendulum hung laser which can identify desired elevations.

In another aspect of the invention, the laser scanner is remotely controlled.

In yet a further aspect of the invention, the laser scanner is provided with a mechanism for damping the motion of the pendulum upon which the laser is mounted.

In yet another aspect of the invention, the damper utilizes eddy currents to effect the damping action.

In still a further aspect of the invention, the laser scanner includes a damper which utilizes a fluid in order to damp the motion of the pendulum.

In yet a further aspect of the invention, the laser scanner is able to project a vertical as well as a horizontal beam in order to align the laser scanner vertically and simultaneously make a determination of elevation.

It is a further object of the invention to provide a low cost pendulum style, remote controlled, laser positioning system.

It is a yet another object to provide an auto-leveling pendulum laser system for carpenters, plumbers and craftsmen and tradesmen in order to determine elevation.

Other inventive aspects and objects are set out below.

BRIEF DESCRIPTION OF THE FIGURES

FIG. 14 is a cross-sectioned elevational view of the embodiment of the invention of FIG. 13.

DETAILED DESCRIPTION OF THE PREFERRED EMBODIMENT

Figure 1:
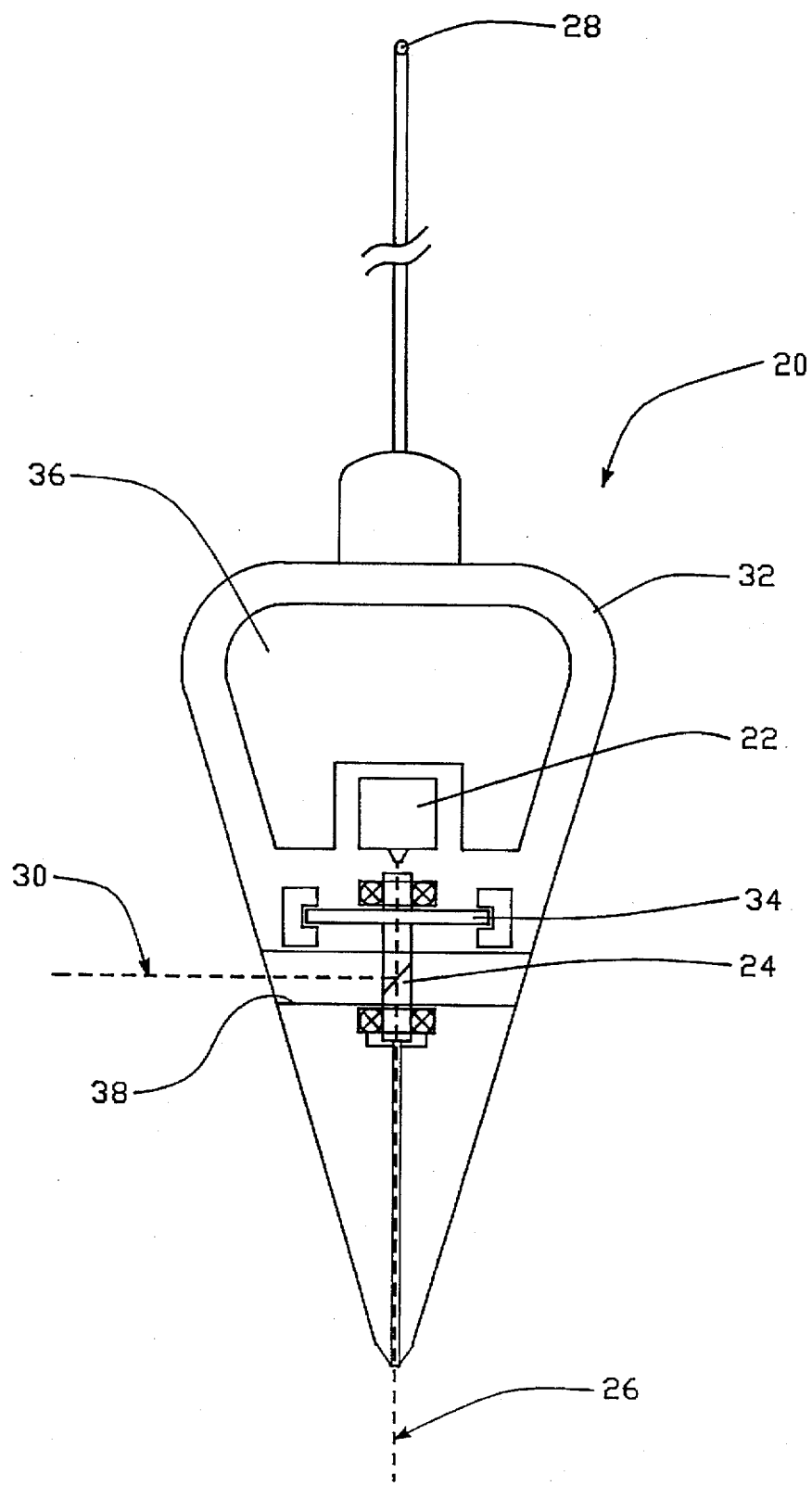
FIG. 1 is a partial cross-sectional view of an embodiment of the invention in a conventional plumb bob configuration.

Embodiment 1 (FIG. 1)

The laser scanner 20 is a new tool that functions both as a plumb bob and also as a builder's level. The device uses an internal laser 22 (laser diode) with 90° beam splitter optics 24 aligned to project two laser beams: the downward pointing vertical beam 26 projects a dot on the true vertical point below the hanging point 28, and the perpendicular horizontal beam 30 projects a true horizontal with respect to gravity. By spinning either the body 32 or the beam splitter optics 24 inside the laser scanner 20, the 90° split beam will scan a true horizontal plane with respect to gravity. An elevation line can be projected on all surfaces within the projecting range of the beam. The beam splitting optics 24 can be rotated using motor 34 which is energized by rechargeable batteries 36. As can be understood, a spring charged motor can also be used.

The downward pointing beam 26 of the laser scanner 20 offers several important advantages over the traditional plumb bob. The laser scanner 20 projects the true vertical mark point, eliminating the user's task of estimating where the bob point would intersect the object to be marked. Because the point is projected, the height of the bob above the work surface is not critical.

The downward beam 26 also allows a vertical reference to be projected from a great height without dealing with a long length of string and the associated wind errors. The laser scanner 20 can be hung from a short string and the projected beam 26 will mark a true vertical point on anything within the range of the beam strength.

The horizon plane feature (horizontal beam 30) simplifies the task of levelling anything with respect to gravity. By hanging the laser scanner 20 in the middle of a work environment, all work that would normally require a carpenter's level or a builder's level can be accomplished with at most a scale such as a tape measure.

The horizontal plane is projected by rotating a beam which is perpendicular to the axis of the laser scanner 20. This can be accomplished by various means. One method is to revolve the whole scanner 20 while the laser beam exits the scanner 20 at one particular point. Either an electric motor or a windup spring motor can be used to spin the scanner body 32. Another method is to sweep the perpendicular beam relative to the scanner body 32. By rotating either a 45° angled reflecting mirror, a 90° beam splitter, or a separate laser with an electric or spring driven motor, a plane will be projected. The scanner body 32 has approximately a 360° window 38 through which the beam can project.

Embodiment II (FIGS. 2–5)

Figure 2:
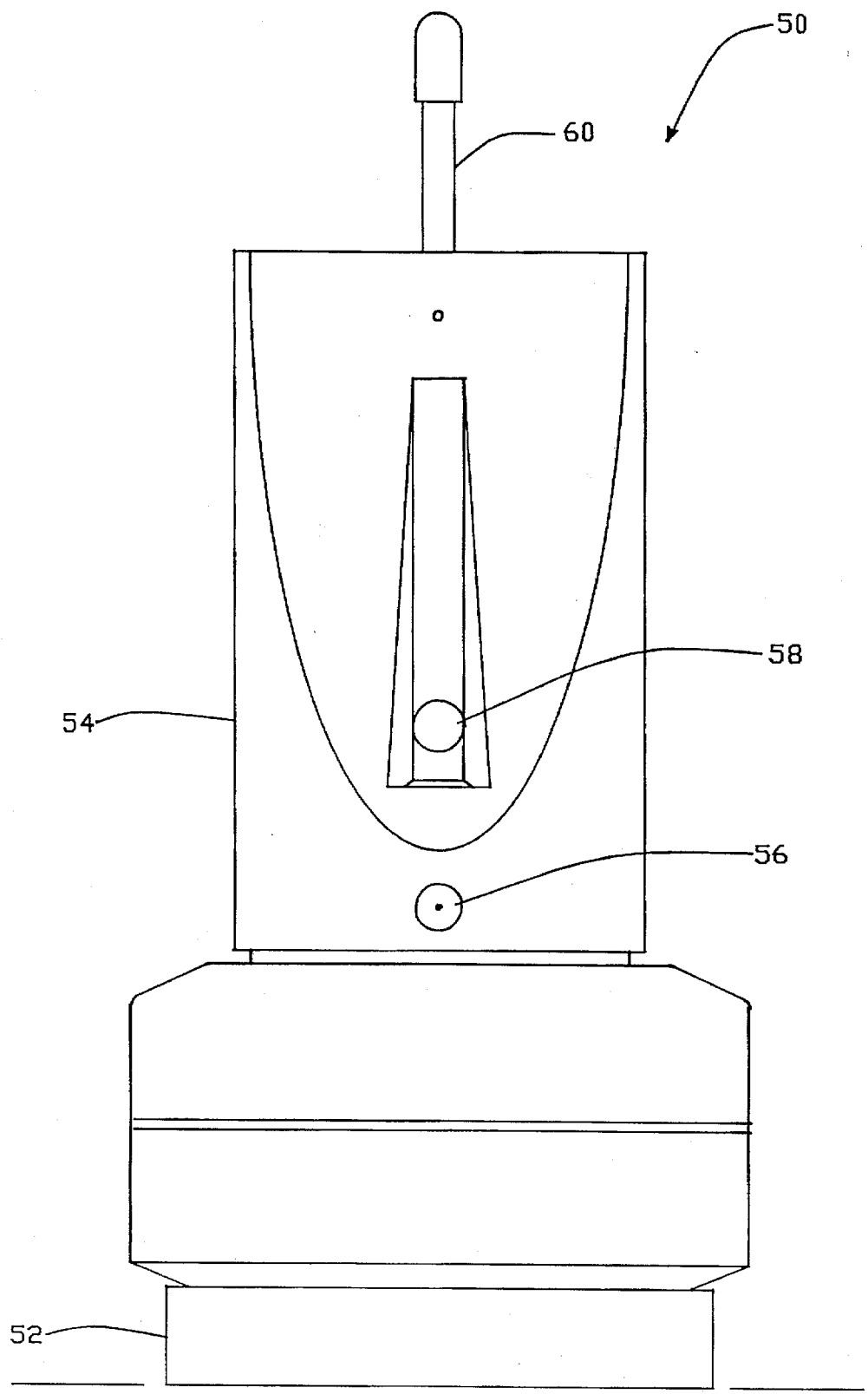
FIG. 2 is a front elevational view of an embodiment of the invention which is meant to be mounted by its base.
Figure 3:
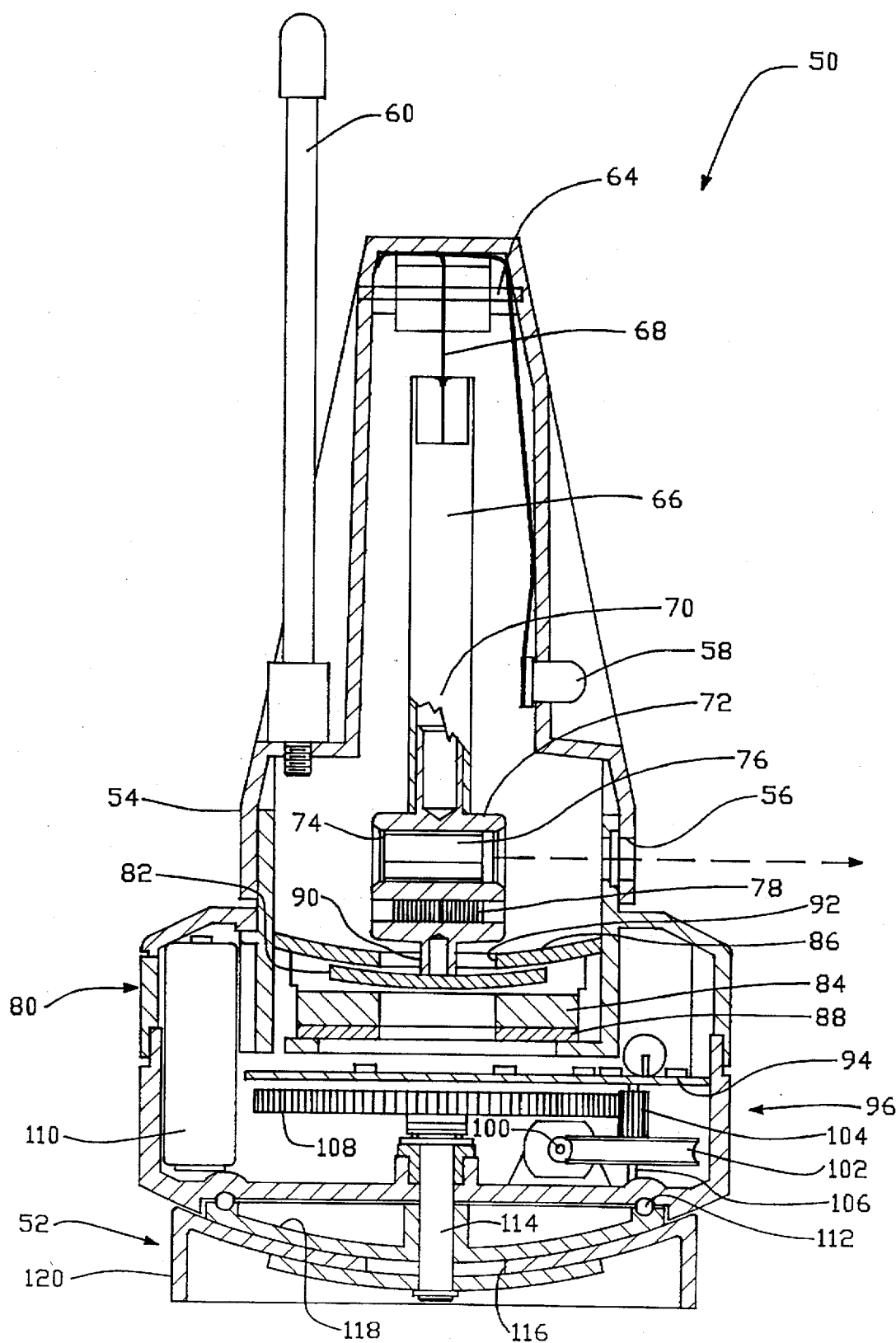
FIG. 3 is a cross-sectional view of the embodiment of FIG. 2 rotated by 90°.
Figure 4:
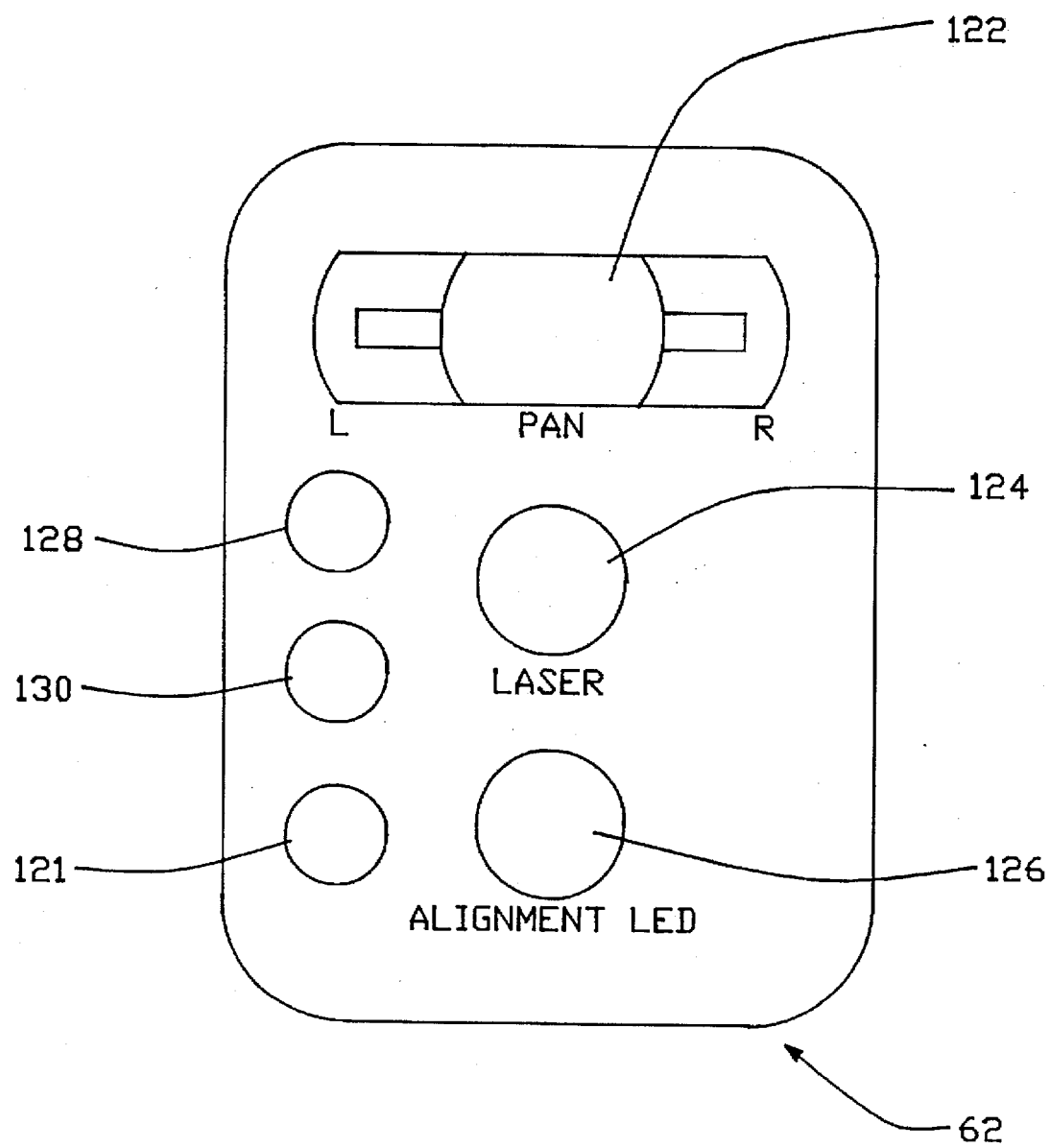
FIG. 4 is a elevational view of a handheld remote control for the embodiment of FIG. 2.

Another embodiment of the laser scanner 50 of the invention is depicted in FIGS. 2–5. In FIG. 2, the laser scanner 50 includes a base 52 on which is mounted a rotatable housing 54. Base 52 is intended to be mounted on, for example, a stable surface such as a desk top or the top of a tripod. In FIG. 2 it can be seen that the laser scanner 50 further includes a port 56 out of which a laser beam can be projected and a broad light source 58 which can include, for example, an LED for purposes of easily determining position of the laser light coming from port 56 as will be discussed hereinbelow. Also included in FIG. 2 is an antenna 60 which can be used to signal the laser scanner 50 using a remote control 62 (FIG. 4).

Turning to FIG. 3, the laser scanner 50 includes a pivot pin 64 from which a pendulum 66 is hung. The pivot pin 64 allows the pendulum 66 to rotate in and out of the page. The pendulum 66 is hung by a flexure 68 allowing the pendulum 66 to pivot from side to side in the plain of the page. The flexure 68 in a preferred embodiment is comprised of a polyimide which is sold under the tradename Kapton. Mylar® can also be used. It is to be understood that other plastics and metal materials can be used a the flexure.

The pendulum 66 includes an elongated body 70 with a transverse laser mount 72 at its distal end. The transverse laser mount 72 includes a bore 74 which can receive a laser light source. In a preferred embodiment, the laser source 76 includes a laser diode with appropriate optics. In this preferred embodiment, the laser is capable of generating a red light with a wave length of 650 nanometers. The light is projected through the port 56.

Underneath the laser 76 is an adjustment screw 78 which can be positioned and repositioned in order to adjust the center of gravity of the pendulum 66 relative to the pi rot pin 64.

Also located beneath the laser 76 is a damper arrangement 80. The damper arrangement 80 includes a copper disk 82 which is secured to the base of the pendulum 66. The damper arrangement 80 also includes a magnet 84 which is secured to housing 54. Magnet 84 can be a permanent magnet or as electromagnet. As the pendulum 66 swings relative to the pivot pin 64, the copper disk 82 swings with two degrees of freedom relative to the magnet 84. The swinging motion generates eddy currents in the copper disk 82, damping the swinging of the pendulum 66. It is to be understood that other compositions and materials can be used to generate eddy currents and thus a damping effect between the pendulum 66, and the housing 54 of the laser scanner 50. As can be seen in FIG. 3 the damper mechanism 80 is encased between the steel plates 86 and 88. The copper disk 82 is hung from the pendulum 66 by an extension 90 which extends through an aperture 92. In this embodiment, the aperature preferably allows a plus or minus 3° swing of the pendulum 66.

Located below the damping arrangement 80 is a circuit board 94 which will be discussed in greater detail with respect to FIG. 5. Below the circuit board 94 is the motor and gear arrangement 96. The motor and gear arrangement 96 includes a motor 98 which is preferably a DC motor. Stepper motors and other types of motors can also be used in this arrangement. Also used in the rotatable housing 54 is the battery 110.

The motor and gear arrangement 96 further includes a first gear 100 which is mounted to the shaft of motor 98. The second and third gears 102, 104 are mounted on a rotatable shaft 106. Gear 104 meshes with fourth gear 108. Fourth gear 108 is fixed and does not move relative to base 52. Thus, as the motor 98 is operated, the motor, as the second and third gears 102, 104, as well as the entire rotatable housing 54, rotates above the base 52 and about the fourth gear 108.

The rotatable housing 54 is mounted to the base 52 by a set of ball bearings 112. As can be seen in FIG. 3, the fixed shaft 114 upon which the fixed fourth gear 108 is mounted projects through a aperture 116 of the base 52. The aperture 116 allows a plus or minus 5° of movement of the shaft 114. Thus in combination with the movement allowed by aperture 92, the pendulum 66 can be aligned approximately plus or minus eight degrees in any direction relative to the housing bore 52. The lower portion 118 of the base 52 which is substantial spherical can be moved relative to the fixed portion 120 of the base 52, up to the limits of the movement of the shaft 114 in the aperture 116.

The broad light source 58, the laser 76, and the antenna 60 are all electrically communicated with the circuit board 94 by traces as shown in the figure. The broad light source 58 is readily observable and helps the user to determine the orientation of the laser 76 and the light emitted therefrom.

FIG. 4 depicts a handheld remote control 62. In a preferred embodiment, remote control uses radio frequency signals in order to control the position and movement of the laser scanner 50.

It should be understood that the remote control need not be limited to radio frequency technology. Any suitable electromagnetic frequency could be used (radio, microwave, very low frequency, IR, visible light, etc.). Acoustic transmission including ultrasonic frequencies could be used. It would even be possible to use a voice command system that would not require any remote control.

The remote control 62 includes in this preferred embodiment a pan button 122 which causes the motor to drive the rotatable housing 54 in a clockwise or counterclockwise direction. The remote control 62 further includes a laser diode or off switch 124 and a broad light source 126. Also included on the control is a memory button 128 which stores in the memory of the laser scanner 50 a desired position, and a return button 130 which causes the rotatable housing 54 to return to a stored location.

The angular velocity of housing 54 could be adjusted from slow to fast by pushing the pan button 122 more in the clockwise or counterclockwise direction. A very slow rate would make it much easier to point the laser in a desired direction. A fast rate would save time when making large angle changes. For units that continuously sweep the laser, a continuous sweep button 121 is used. The angular velocity can also be remotely adjusted using the pan button 122 in conjunction with the sweep button 121.

Figure 5:
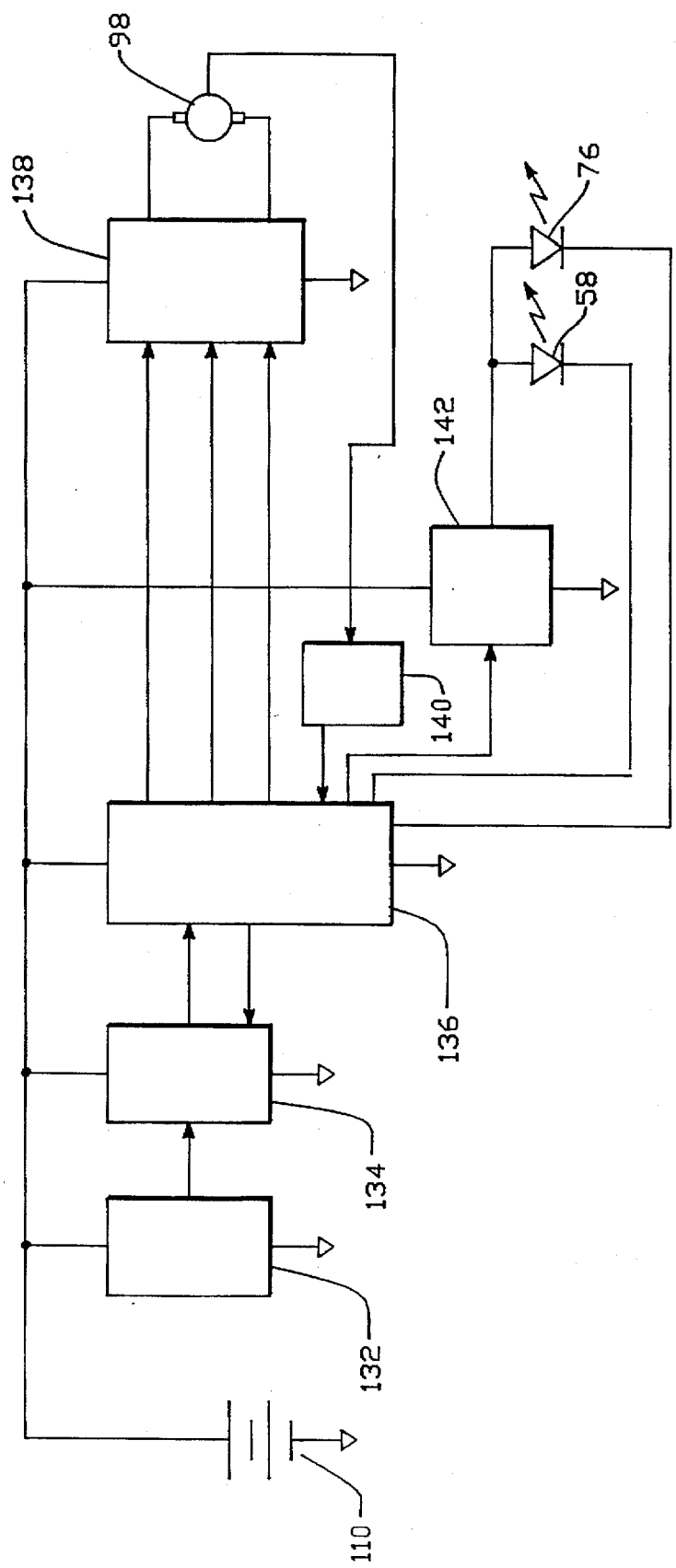
FIG. 5 is a schematical representation of the circuitry for the embodiment of FIG. 2.

FIG. 5 depicts a representative schematic for the circuit provided on circuit board 94 of the embodiment of FIG. 3. The circuit as shown in FIG. 5 includes the above-mentioned battery 110 which is connected to a RF receiver 132. The signal from the RF receiver 132 is decoded in decoder 134, with decoder 134 providing data and commands to microprocessor 136. Microprocessor 136 provides a signal to in this preferred embodiment an H bridge 138. H bridge 138 allows use of a single battery to drive the DC motor 98 in either a forward or reverse direction. In this preferred embodiment, pulse width modulation signals are sent from the microprocessor 136 to the H bridge 138 in order to drive the motor 98. Further a direction signal is sent from the microprocessor to the H bridge 138 in order to select the direction that the motor 98 will be driven. Finally, a brake signal is set for the microprocessor 136 to the H bridge 138 in order to stop the movement of the motor 98. The motor 98 includes an encoder which sends a signal to the encoder counter 140 for purposes of determining the position of the motor 98. Encoder counter 140 communicates with the microprocessor 136 for storing the location of the laser 76, as desired. Finally, the circuit of FIG. 5 depicts the voltage regulator 142 which applies an appropriate voltage to the broad light source 58 and the laser 76.

The remote control feature of the present embodiment affords a number of advantages to this invention. First, the laser scanner 50 can be remotely turned on and off without having to walk to the scanner 50, thus extending the life of the battery mounted in the laser scanner 50. Another user does not have to walk back to the laser scanner in order to reposition it to a desired position.

As the laser scanner car be rotated as desired or held in a fixed position as desired, a weaker laser source can be used and still be identified by the user. Were the laser source continually scanning, a stronger laser source would have to be used in order for the laser beam to be identifiable by the user. Further, as the laser source can be stopped in a desired position, and the laser can be allowed to come to a settled position before a measurement is made and thus there is no need to design in this embodiment expensive anti-vibrational mechanisms which prevent the laser scanner from vibrating. Such vibrations could make a difference in the position of the laser light when it strikes its target. As the layer scanner 50 can come to a full stop position with the laser light on the pendulum 66 can settle before the laser beam is used to determine a horizontal or vertical position.

Embodiment III (FIGS. 6–11)

Figure 6:
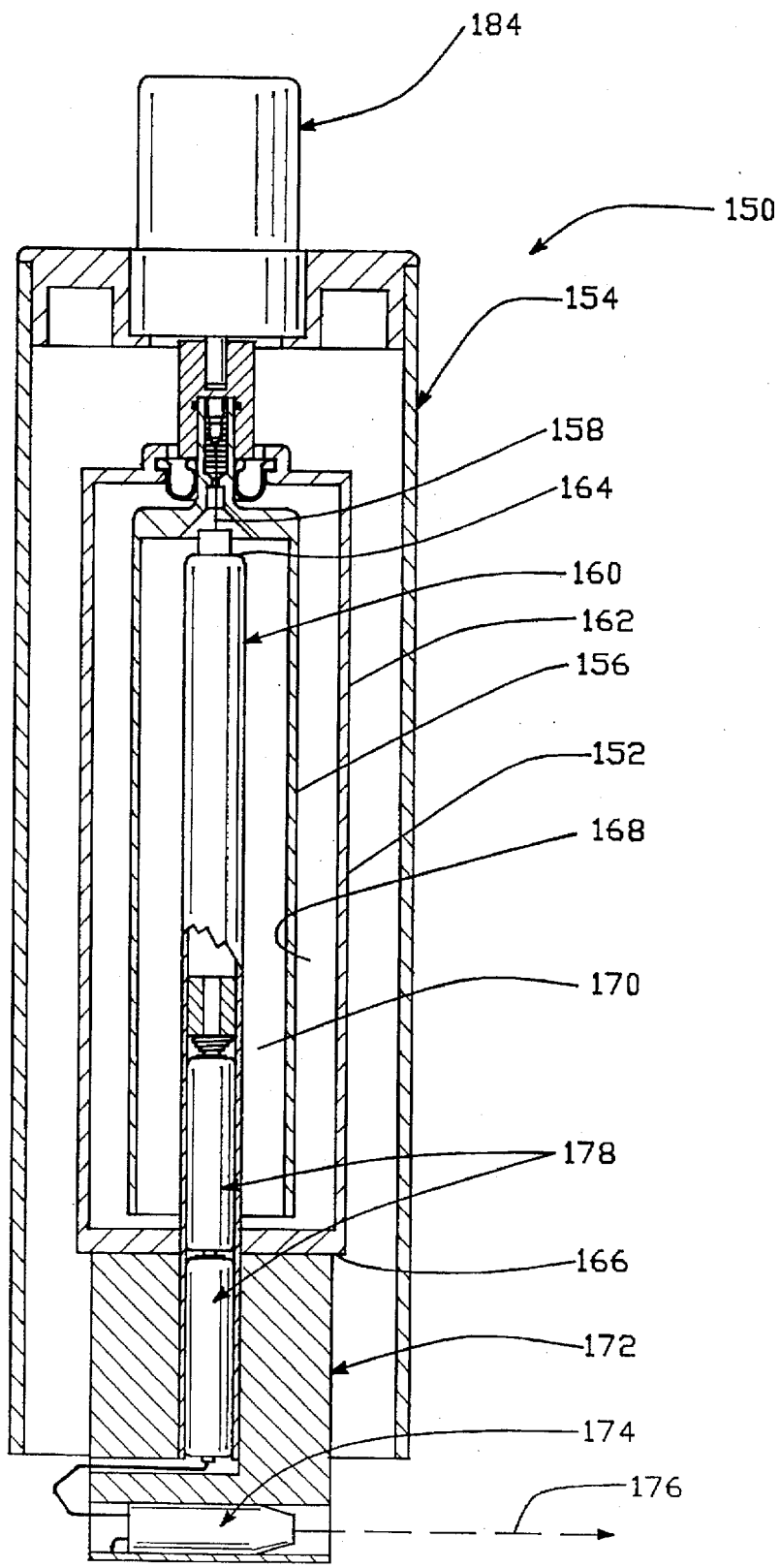
FIG. 6 is a cross-sectioned elevational view of another alternative embodiment of the invention which is meant to be hung from a platform.
Figure 7:
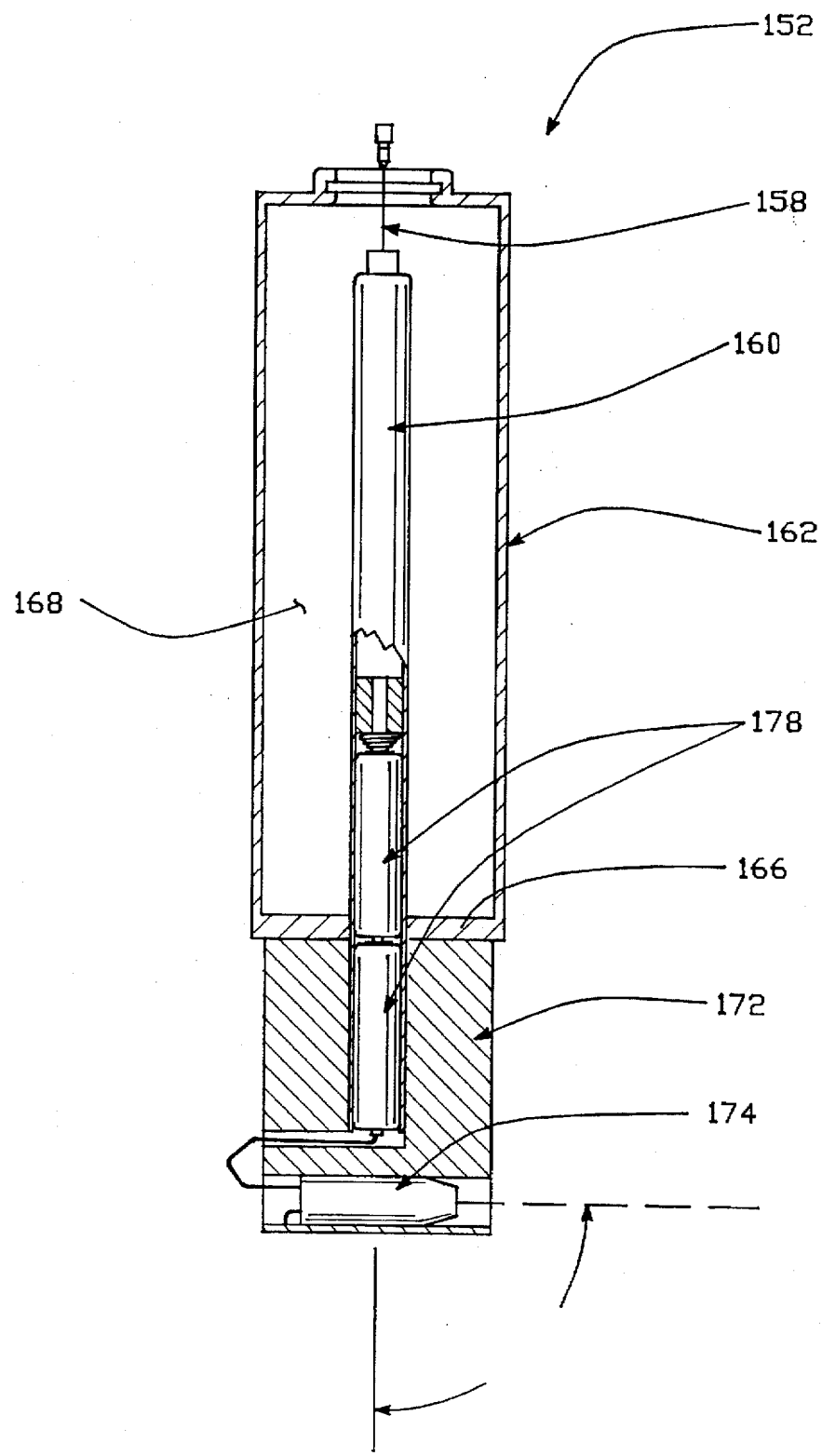
FIG. 7 is a cross-sectioned elevational view of the pendulum assembly of the embodiment of FIG. 6.

FIG. 6 shows a side cross-sectioned elevation view of the laser scanner 150 which represents another embodiment of the invention. The laser scanner 150 is comprised of three subassemblies. These subassemblies are the pendulum subassembly 152 shown in FIG. 7, the housing subassembly 154 shown in FIG. 8, and the dasher subassembly 156 shown in FIG. 9.

Figure 11:
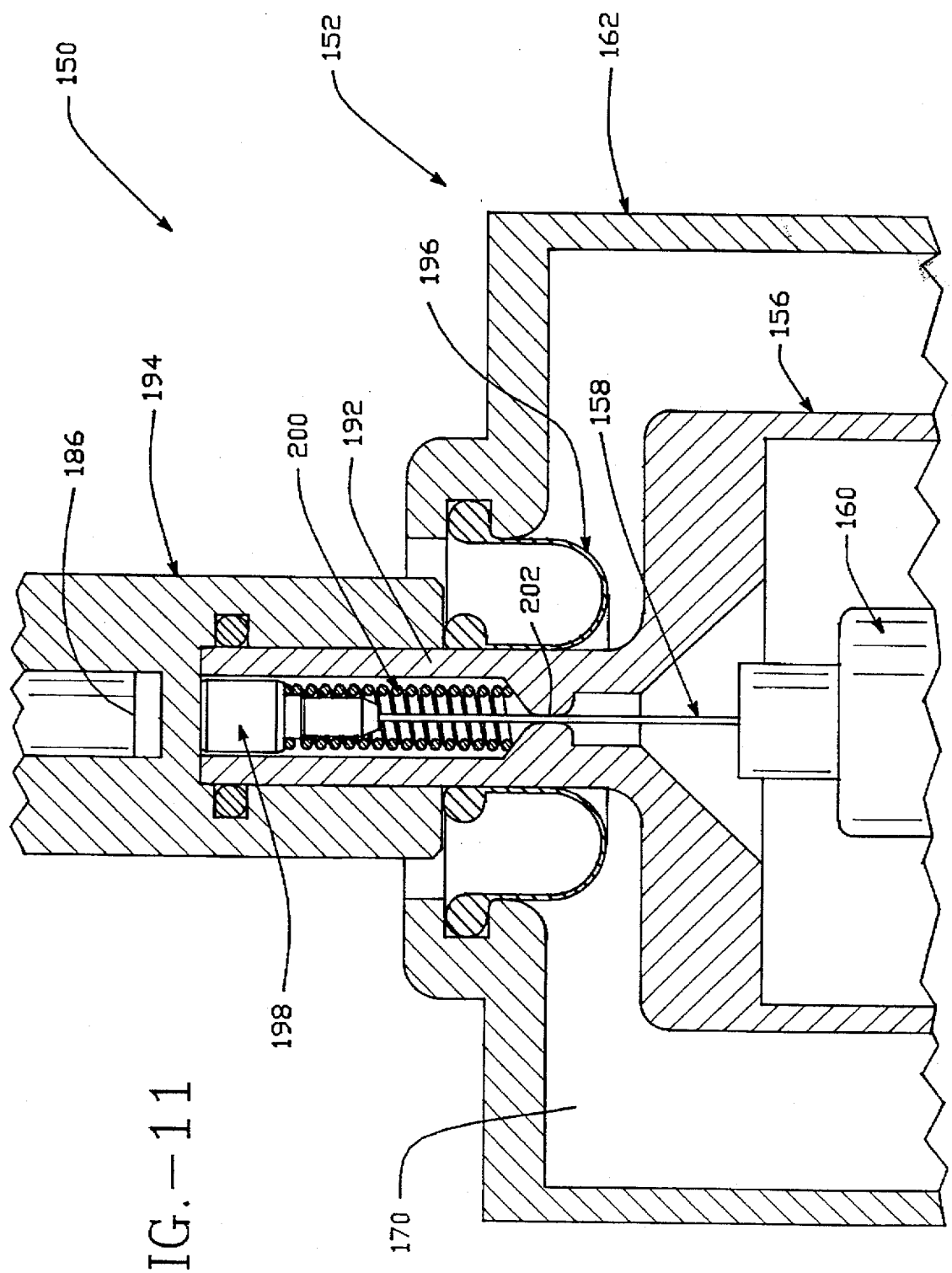
FIG. 11 is a cross-sectioned partial, enlarged view of the embodiment of the invention of FIG. 6.

Looking at FIGS. 6 and 11, the pendulum 152 is supported at the top by a filament 158. In a preferred embodiment, the filament 158 can be comprised of nylon. Below the filament 158, there is a pair of concentric tubes, inner tube 160 and outer tube 162 of pendulum 152. The filament 158 is attached to the closed top end 164 of the inner tube 160. A bottom plate 166 connects the inner tube 160 to the outer tube 162. The annular volume 168 between the two tubes 160, 162 is filled with a damping liquid 170. A weight 172 is attached to the bottom of the two tubes 160, 162. A diode laser 174, in a preferred embodiment, is located near the bottom of the weight 172. The laser 174 is aligned to produce a horizontal beam 176 when the pendulum 152 is supported by the filament 158. Batteries 178, which power the diode laser 174, are located in the bottom end of the inner tube 160. With the exception of the filament 158 and the damping liquid 170 between the two tubes, all the other parts of the pendulum act as a rigid body.

Figure 8:
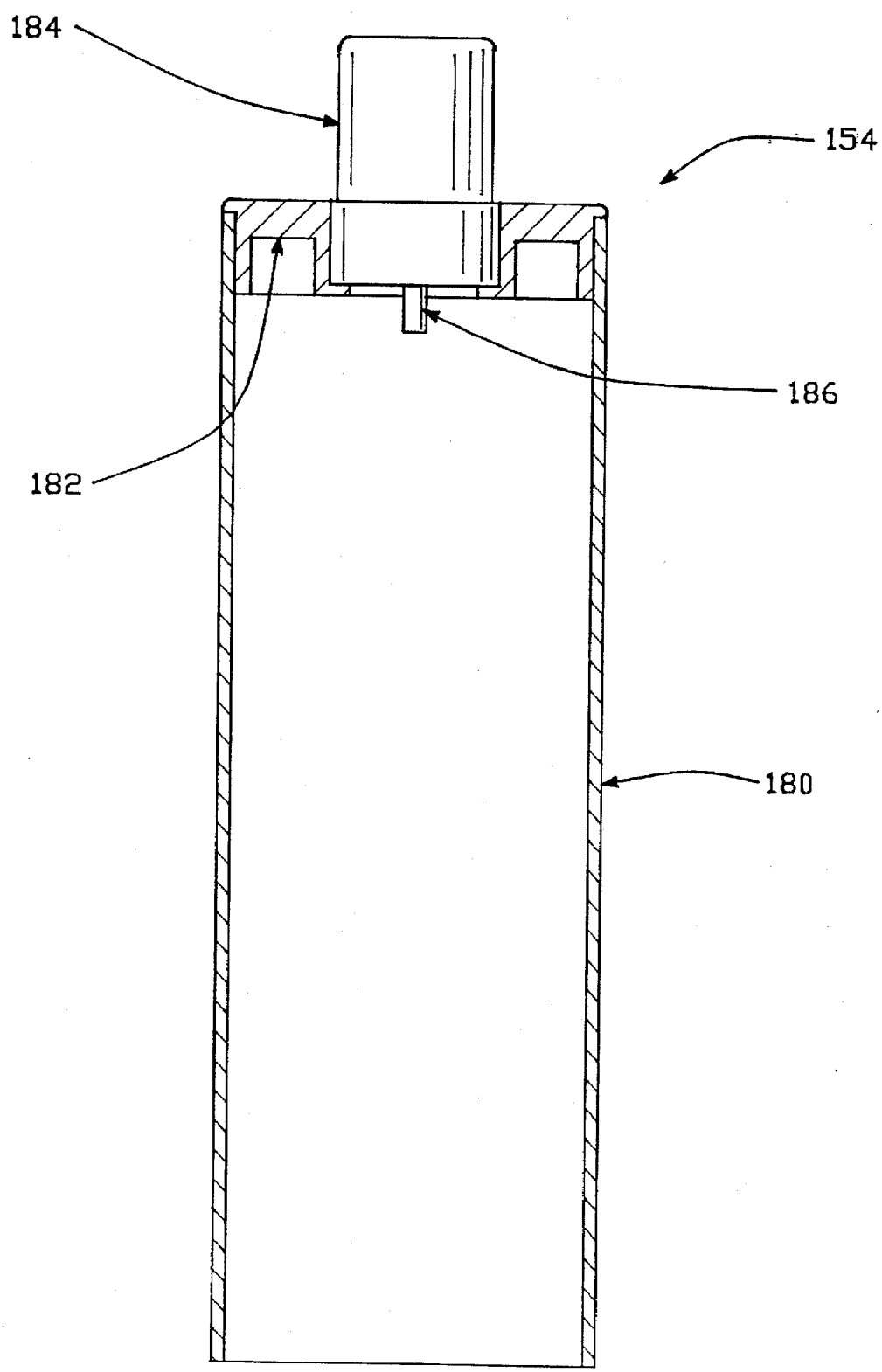
FIG. 8 is a cross-sectioned elevational view of the housing assembly of the embodiment of FIG. 6.

FIG. 8 shows a cross-sectioned elevation view of the housing subassembly 154. The housing 154 is comprised of a cover tube 180, an end plug 182, and a gear an motor arrangement 184. The gear and motor arrangement 184 is located at the top end of the cover tube 180. The gear and motor arrangement 184 is oriented with its output shaft 186 facing down. The shaft 186 is concentric with the cover tube 180. The end plug 182 attaches the ear and motor arrangement 184 to the top end of the cover tube 180. These three parts act as a rigid body.

Figure 9:
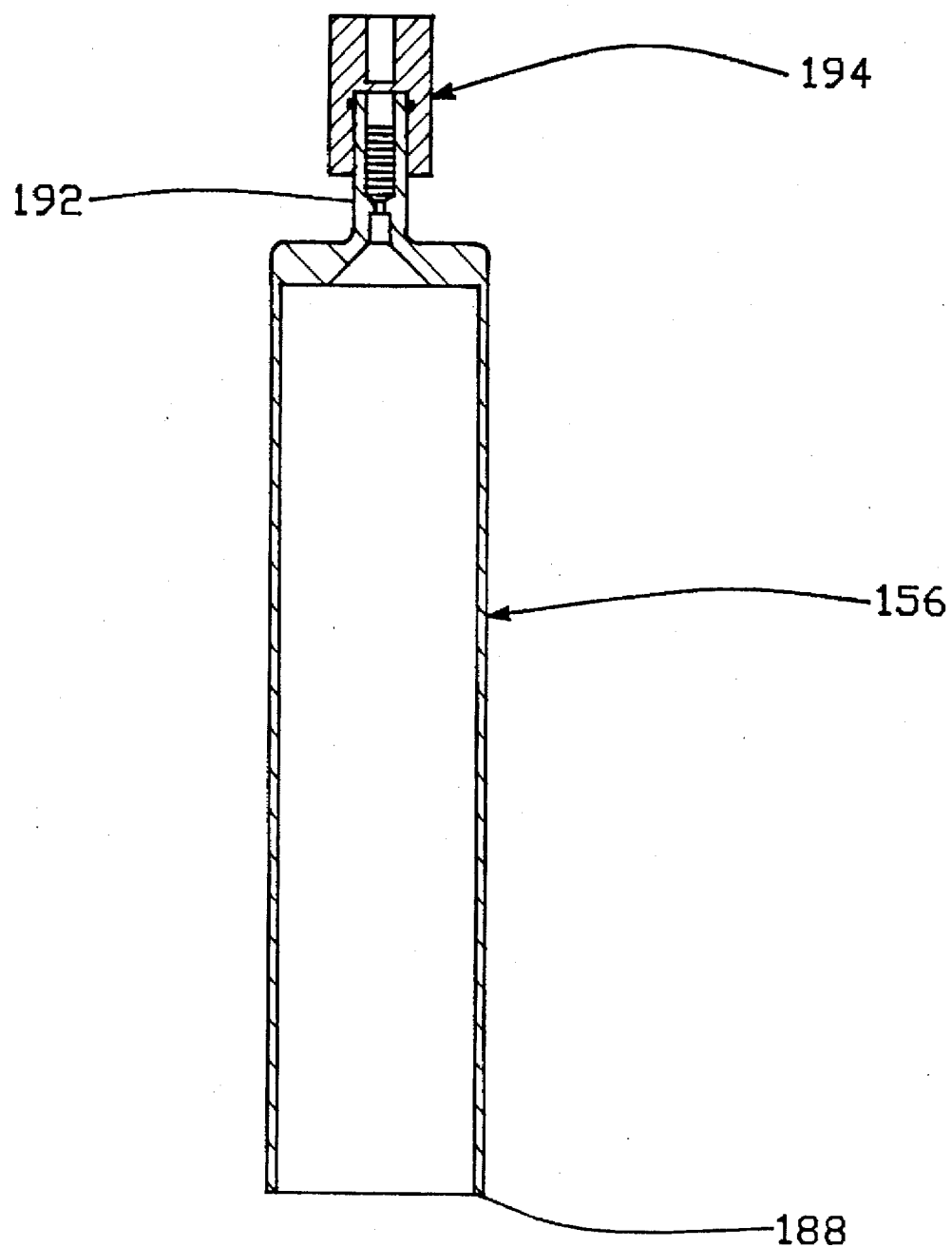
FIG. 9 is a cross-sectioned elevational view of the dasher assembly of the embodiment of FIG. 6.

FIG. 9 shows a cross-sectioned elevation view of the dasher subassembly 156. The dasher 156 is a vertical tube with an open bottom end 188, and a closed upper end 190. A short cylindrical shaft 192 projects above the closed upper end 190. This shaft 192 is concentric with the dasher 156. A shaft coupling 194 is attached to the shaft 192. Several other small parts and features are located inside the shaft and the coupling. They will be discussed later with respect to FIG. 11. The dasher 156 and the coupling 194 act together as a rigid body.

FIG. 11 shows how the three subassemblies are connected together. The upper end of the filament 158 and the pendulum 152 are attached to the top end of the dasher assembly 156. The dasher 156 is located in the annular volume 168 between the inner tube 160 and the outer tube 162 of the pendulum 152. The shaft coupling 194 on the dasher assembly 156 is clamped to the gear and motor arrangement output shaft 186. This places the pendulum and dasher assemblies 152, 156 inside of the cover tube 180. Only the laser diode 174 and the bottom of the weight 172 project out below the cover tube 180. This protects the pendulum 152 from the wind. A clear tubular window could be added for more protection from the wind.

In FIG. 11 rubber diaphragm 196 has an annular shape with one or more convolutions. Diaphragm 196 is thin and flexible. The inside diameter of the diaphragm 196, seals around the shaft 192 that projects from the upper end of the dasher 156. The outside diameter of the diaphragm 196 seals to the top end of the outer tube 162 of the pendulum 152. The convoluted diaphragm 196 (FIG. 11 ) has two functions. First, it keeps the liquid 170 from leaking out of the pendulum assembly 152. Second, it acts as a torsional coupling between the dasher assembly 156 and the pendulum 152. As seen in FIG. 11, the upper end of the filament 158 is held in an end stop fitting 198. This fitting 198 supports the filament 158. A coil spring 200 under the end stop fitting 198 is preloaded to hold the fitting 198 up against the bottom of the shaft coupling 194. The preload force is larger than the weight of the pendulum assembly 152, but it is lower than the breaking strength of the filament 158. The spring 200 is used to protect the filament 158 from breaking. If the pendulum 152 is pulled downward, the spring 200 will reflect and the pendulum 152 will move downward. The top of the pendulum 152 will hit and stop on the top of the dasher 156 before the filament 158 breaks.

The filament 158 must be flexible so that it will not prevent the pendulum 152 from hanging vertically. The filament 158 gets more flexible as it gets longer. As the filament 158 gets longer, it becomes easier for the pendulum 152 to wobble. This tendency is reduced by passing the filament 158 through a small hole 202 near its mid-section. The small hole 202 helps to constrain side movement of the pendulum 152.

The convoluted diaphragm 196 is centered about the small hole 202 that the filament 158 passes through. When the pendulum 152 swings, it tends to pivot very near the small hole 202. As a result, any side force on the pendulum 152 by the diaphragm 196 will produce very little moment to affect the angle of the pendulum 152. Also, because the diaphragm 196 is close to the pivot, only small deflections are produced in the diaphragm 196 when the angle of the pendulum 152 changes. This minimizes the moment on the pendulum 152.

Figure 10:
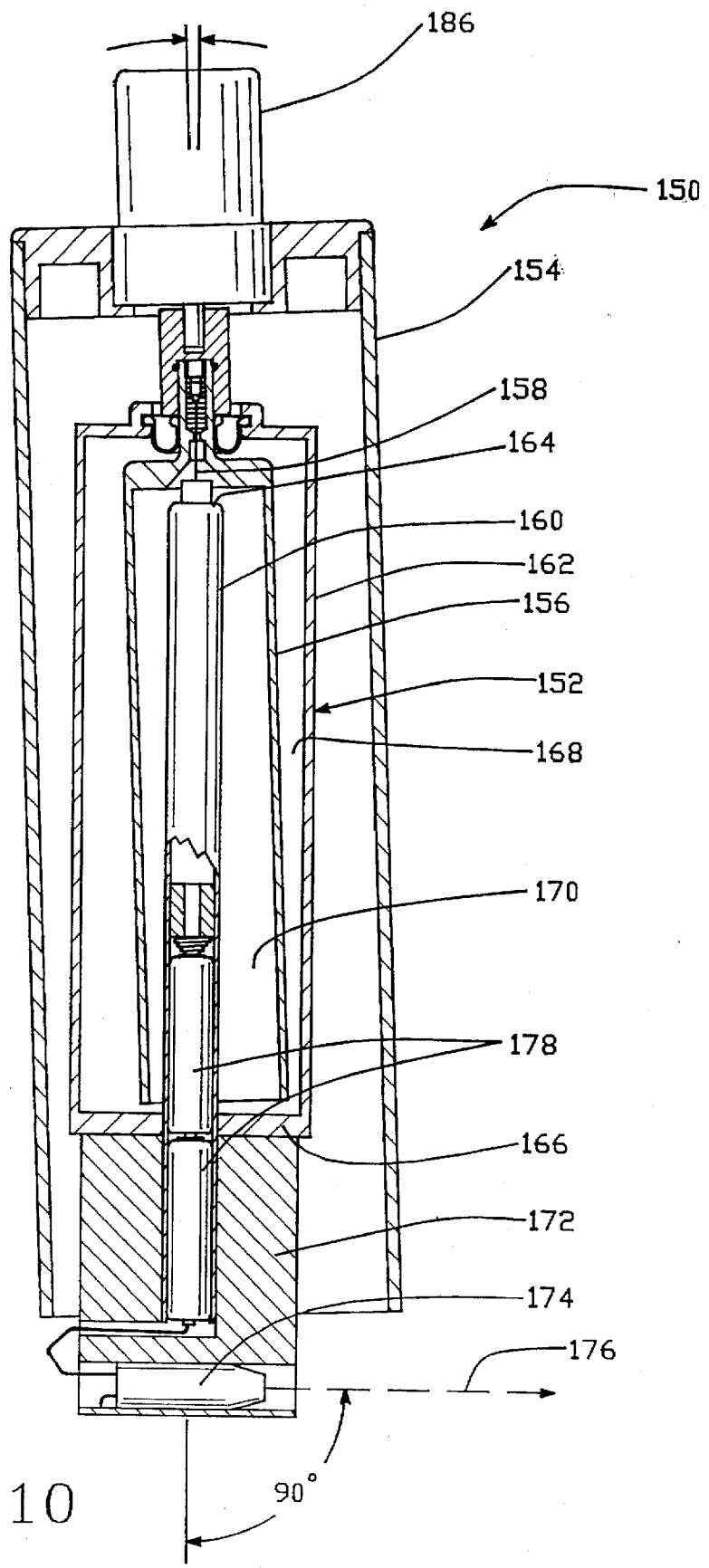
FIG. 10 is a view similar to FIG. 6 showing the embodiment of the invention in a different orientation.

As mentioned previously, the diode laser 174 is aligned relative to the other parts of the pendulum 152 to produce a beam 176 when the pendulum 152 is supported by the filament 158. The dasher 156 and the liquid 170 located in the pendulum 152 act to damp the swing of the pendulum 152. Swinging of the pendulum 152 produces a relative motion between the liquid 170 and the dasher 156 (FIG. 10). The relative motion produces viscous drag forces in the fluid. These forces dissipate the energy of the swinging pendulum 152.

In normal use, the laser scanner 150 would be fastened at a desired elevation to an external support. The housing would be aligned to within about 3° of vertical. One or more bubble level vials (see the embodiment in FIG. 13) located on the housing could be used for the vertical alignment. FIG. 10 shows the laser scanner 150 with a small alignment error between the housing and vertical. It can be seen that the pendulum 152 is free to having vertically as long as the housing 154 is aligned within a few degree of vertical. When the gear and motor arrangement 184 is energized its output shaft will rotate the dasher 156. The rotation of the dasher 156 will be coupled through the diaphragm 196 to the pendulum 152 and thus can rotate the laser 176.

Figure 12:
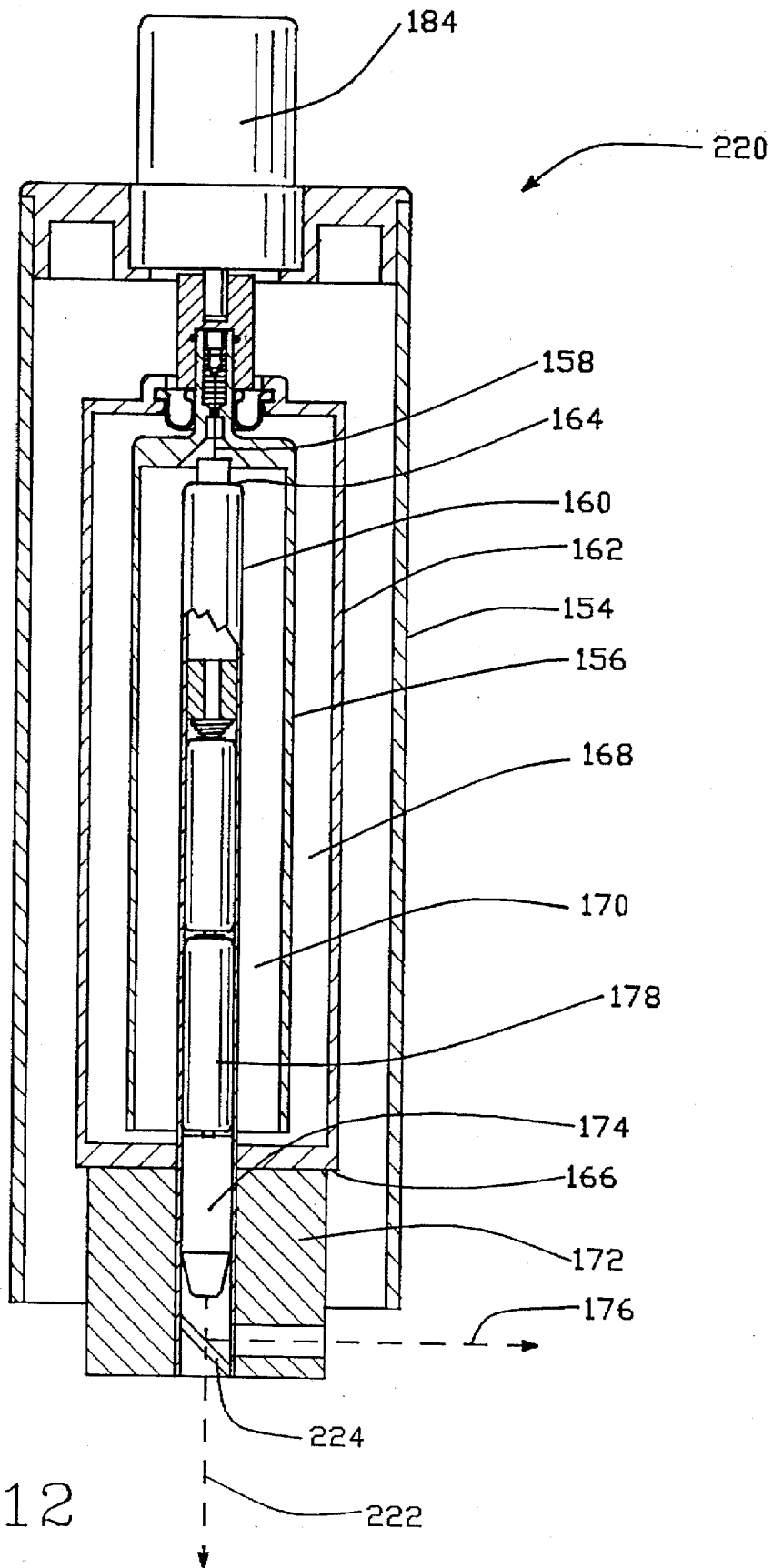
FIG. 12 is a cross-sectioned elevational view of an alternative embodiment of the invention.

Embodiment IV (FIG. 12)

FIG. 12 depicts yet another embodiment of the laser scanner 220 of the invention. This embodiment is in many respects similar to the embodiment above demonstrated with respect to FIGS. 6—11, and thus similar reference numbers are applied. However, in this embodiment 220, the laser 174 is oriented in a vertical direction so that it provides a vertical beam 222. Through one use of optics 224, a horizontal beam 176 is also provided. Thus, as in the first embodiment as shown in FIG. 1, in this embodiment, both horizontal and vertical beam can be provided so that the laser scanner 220 can be hung over a position and simultaneously identify an elevation.

Figure 13:
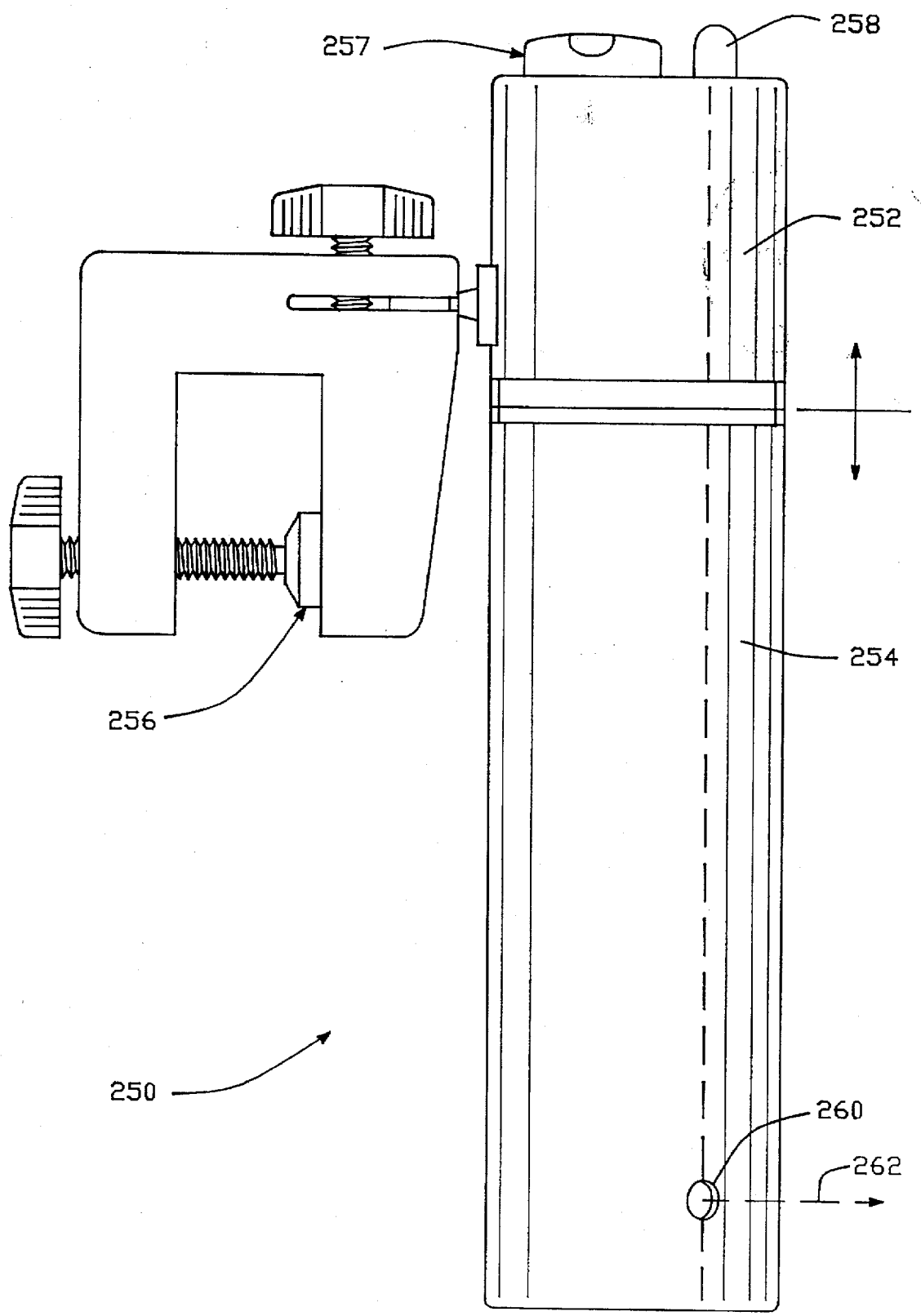
FIG. 13 is an elevational view of another alternative embodiment of the invention.

Embodiment V (FIGS. 13–14)

Yet a further embodiment of the invention is shown in FIGS. 13 and 14. This embodiment has number of the attributes of the several embodiments described hereinabove. As can be seen inn FIG. 13, the laser scanner 250 includes upper fixed housing 252 and a lower rotatable housing 254. The upper fixed housing 252 can be secured to a fixed location by the clam 256. The upper fixed housing 252 includes a bubble level 257 assist in determining a course orientation to the laser scanner 250. Additionally, an LED light source 258 is used to indicate when the laser scanner 250 is turned on. At the bottom-most portion of the lower rotatable housing 254 is a port 260 out of which a laser beam 262 from a laser diode can be projected.

Turning to FIG. 14, it an be seen that the laser scanner 250 includes a bearing arrangement 264 which allows the lower rotatable housing 254 to rotate relative the upper fixed housing 252. The laser scanner 250 includes a 266 to which is mounted a laser 268 in much the same manner as with respect to prior embodiments. This embodiment additionally in a damping mechanism 270 which is similar in operation to magnetic damping mechanism as shown in FIG. 3.

Industrial Applicability

As can be seen from the above, the laser scanner of the invention provides for an economical scanner which is easy to operate in an accurate manner using a remote control. Embodiments provided a smooth operation without vibrations and without expensive anti-vibration elements.

Other aspects, embodiments, and objects for the invention can be observed from a review of the figures and the attached claims. It is to be understood that other embodiments can be developed and be within the spirit and scope of the invention as claimed.

We claim:

1. A laser leveling system comprising:

a housing;

a pendulum mounted in said housing;

a laser mounted to said pendulum so that said laser can move relative to said housing;

a damper mechanism that can dampen the motion of said pendulum;

a base to which said housing is mounted;

said base adapted to be positioned upon a supporting surface;

said housing tiltably mounted relative to said base so that said housing can be adjustably tilted relative to said base;

said housing rotatably mounted relative to said base so that said housing can be rotated relative to said base and thus so that the laser can be panned from a first target to a second target in order to transfer an elevation from the first target to the second target;

a motor that can cause the housing to rotate relative to said base;

a motor controller that can be remotely controlled in order to cause the motor to pan the laser from the first target to the second target, said motor controller responsible to a remote signal;

a remote control device which is located remotely from said housing and which can generate said remote signs in order to cause said laser to pan; and wherein remote control device can cause the laser to pan from the first target to the second target in order to transfer the elevation of the first target to the second target with the locations of he remote control device, and at least one of the first target and the second target being different.

2. The system of claim 1 wherein said motor and said motor controller are located in said housing;

said housing has a first spherical surface;

said base has a second spherical surface;

said first spherical surface is located adjacent to said second spherical surface and movable relative thereto to allow said housing to tilt relative to said base.

3. The system of claim 2 wherein said motor can cause the remainder of the housing to rotate relative to said first spherical surface.

4. A laser leveling system comprising:

a housing;

a laser mounted in said housing;

a positioning device that can position said laser relative to said housing;

a controller mechanism which can be remotely controlled in order to direct said positioning device to position said laser so that the laser can be panned from a first target to a second target in order to transfer an elevation of the first target to the second target;

a remote control which can be located remotely from said housing and which can control said controller mechanism in order to cause said laser to pan; and wherein remote control can cause the laser to pan from the first target to the second target in order to transfer the elevation of the first target to the second target with the locations of the remote control, and at least one of the first target and the second target being different.

5. The system of claim 4 including:

splitter optics which can split beam from said laser into two beams.

6. The system of claim 4 including:

optics which can split a beam from said laser into a horizontal beam and a vertical beam.

7. The system of claim 4 wherein:

said housing is in the shape of plumb bob.

8. The system of claim 4 including:

said housing having a mount so that said housing can be mounted below a platform.

9. The system of claim 4 including:

said housing having a mount so that said housing can be hung from a platform.

10. The system of claim 4 including;

said housing having a mount so that said housing can be mounted on top of a platform.

11. The system of claim 4 wherein:

said housing has a base and a portion rotatably mounted to said base, which rotatable portion houses said laser; and said base has a mechanism that can adjust the orientation of said rotatable portion relative to said base.

12. The system of claim 4 including:

a light source that can be used approximately identify the orientation of the laser.

13. The system of claim 4 including:

a pendulum for mounting said laser in said housing.

14. The system of claim 13 including:

a damper mechanism that can dampen the motion of said pendulum.

15. The system of claim 14 wherein:

said damper mechanism uses eddy currents to dampen the motion of said pendulum.

16. The system of claim 14 wherein:

said damper mechanism uses a liquid to dampen the motion of said pendulum.

17. The system of claim 4 including:

a flexure for allowing the laser to hang from the housing.

18. The system of claim 4 wherein:

said flexure is comprised of polyimide.

19. The system of claim 17 wherein:

said flexure is pivotally mounted to said housing in order to allow the laser to have two degrees of freedom.

20. The system of claim 4 including:

a base;

said housing being rotatable relative to said base, said housing also being tiltably positionble relative to said base in another degree of freedom.

21. The system of claim 17 wherein:

said flexure is comprised of Mylar.

22. The system of claim 4 comprising:

a base to which said housing is mounted;

said base adapted to be position upon a support surface; and said housing moveable relative to said base, with said base having a spherical portion, and said housing having a portion that mates to and is moveable relative to said the spherical portion of said base in order to position said housing relative to said base.

23. The system of claim 22 wherein:

said housing is rotatably secured to said base; and said housing rotates relative to said base about an axis that is upstanding from said base.

24. The system of claim 22 wherein:

said housing can move relative to the spherical portion of said base so the housing can move from a first angle to a second angle relative to an axis upstanding from said base.

25. The system of claim 22 wherein:

said portion of said housing that mates to the spherical portion of said base allows the housing to move from a first angle to a second angle relative to an axis upstanding from said base;

said housing is rotatably secured to said base; and said housing rotates relative to said base about one of (1) said axis upstanding from said base and (2) a second axis upstanding from said base.

26. The system of claim 4 including:

said remote control having a control that controls the speed of pan of the housing and the laser.

27. The system of claim 4 including:

said remote control having a control that allows the housing and the laser to continuously pan.

28. The of claim 4 including:

said remote control having a control that stores in a memory the location of the housing and the laser.

29. The system of claim 28 including: said remote control having a control that allows the housing and the laser to return to a stored position.

* * * * *